Dec. 17, 1935.  H. M. ARMSTRONG  2,024,139
RECEIVING SYSTEM
Filed Dec. 16, 1929
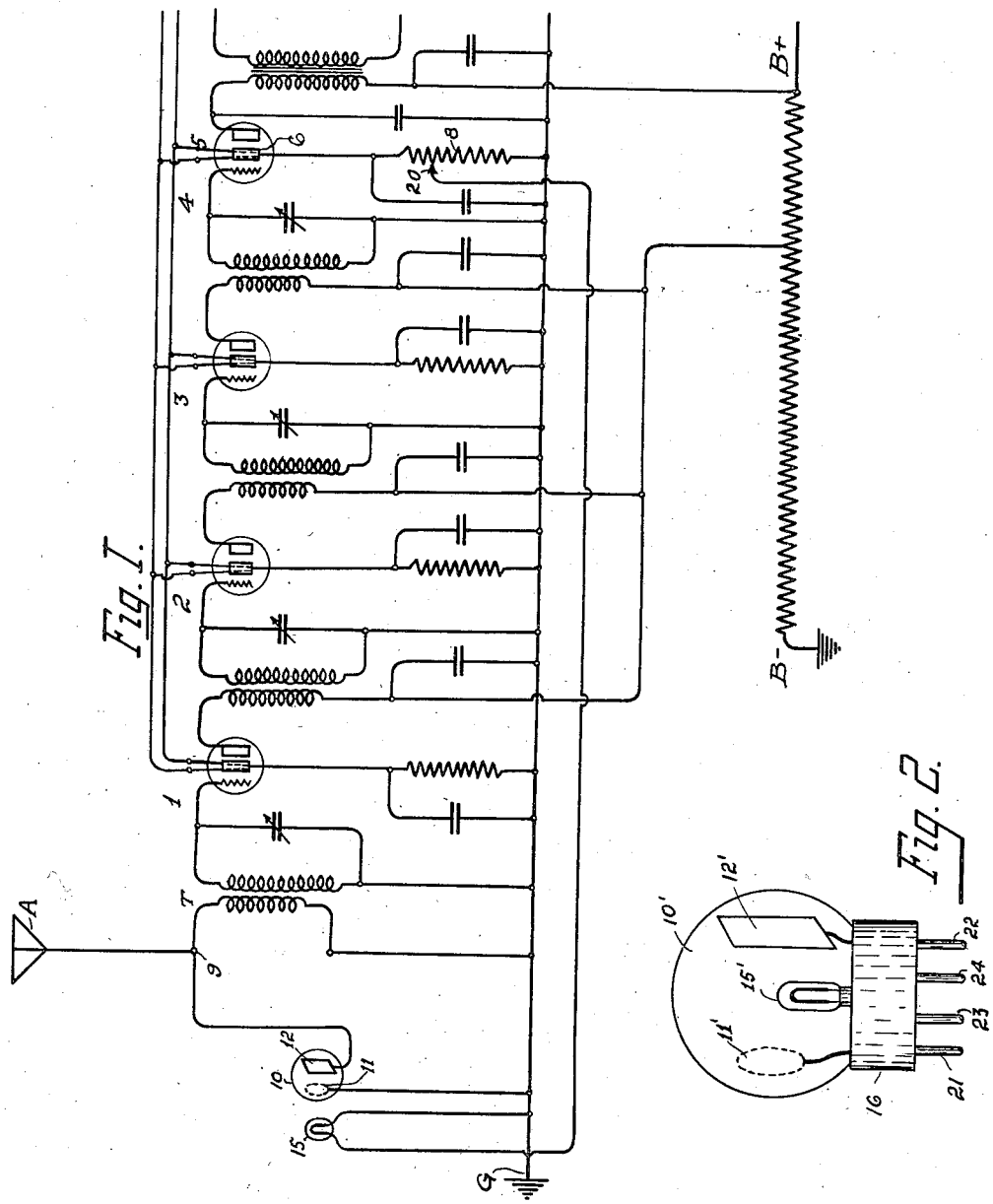
Inventor
H. M. Armstrong
By Gayanoskowski
Attorney.

Patented Dec. 17, 1935

2,024,139

UNITED STATES PATENT OFFICE 2,024,139

RECEIVING SYSTEM

Herbert M. Armstrong, Oak Park, Ill., assignor to Kellogg Switchboard and Supply Company, Chicago, Ill., a corporation of Illinois Application December 16, 1929, Serial No. 414,294

14 Claims. (Cl. 250—20)

My invention relates to radio receiving circuits, its object being to provide a new and efficient method for automatically and manually controlling the volume output of a radio signal amplifying system through control of the input into the same.

A feature of my invention is the provision of a photo-electric cell connected to the antenna in shunt with the first radio frequency transformer and adapted to control the energy input into said transformer.

Another feature of my invention is the provision of a glow lamp cooperating with the photo-electric cell and deriving its heating current from the voltage drop across a resistance in the detector tube plate circuit so as to vary its light intensity in proportion to the variation of the detector tube plate current.

For a better understanding of my invention reference may be had to the accompanying drawing in which Fig. 1 illustrates diagrammatically my volume control device in combination with the radio frequency amplifier and detector stages of an exemplary receiving set.

Fig. 2 illustrates diagrammatically a combination of the photo-electric cell and the glow lamp of my volume control device into a single mounting unit.

Referring now more in detail to Fig. 1, it will be noted that I have shown three radio frequency stages designated respectively 1, 2 and 3 and one detector stage 4, having a vacuum tube 5 whose cathode 6 communicates with ground at G through a resistance 8 which may be the grid biasing resistance. The antenna A communicates with ground on one side through the primary of the first radio frequency transformer T and on the other side through the photo-electric cell 10, tap 9 being common to all three of these members. The photo-electric cell 10 is exposed to the light of the incandescent lamp 15, one terminal of said lamp being connected through slide contact 20 to the detector biasing resistance 8, the other terminal being linked to ground at G. Lamps 10 and 15 may be included in any suitable case.

From these connections it will readily be perceived that a glow of the lamp 15 illumines the sensitive surface 12 of the photo-electric cell 10 and reduces the internal resistance of the cell as existing between the sensitive surface 12 and the electrode 11, thereby diverting a portion of the signal energy coming in from the antenna to ground through said photo-electric cell instead of letting it impress itself in its totality upon the amplifier by passing through the primary of the first radio frequency transformer T.

The intensity of glow of lamp 15 being almost directly proportional to its heating current, the latter being proportional to the voltage drop across the resistance 8, or, in other words, to the current across said resistance 8, it is evident that I have outlined here the principles of an automatic volume control system which lends itself also to manual control. Assuming that at a certain position of the slide contact 20 the amplifier is delivering its normal output while at the same time the lamp 15 is brought to a slight glow causing a small portion of the energy incoming through the antenna to be diverted to ground through the photo-electric cell 10, an increase in the strength of the signal, such as might originate either in the transmitting station, or, as is more frequently the case, may be caused by switching from one station to another in the course of the tuning operation, would cause a larger current to flow in the detector tube plate circuit, and this would result in larger voltage drop across the resistance 8 and in an increased intensity of glow of lamp 15. This in turn would cause a larger amount of energy to be diverted from the amplifier through photo-electric cell 10 and the output volume of the amplifier would be thus automatically reduced to a predetermined value. A decrease in the strength of the incoming signal would have the reverse result; namely, that of permitting a great amount of incoming energy to be utilized by the amplifier. The normal or desired strength of the output can be regulated manually by moving slide contact 20 thus varying the intensity of glow of lamp 15 and predetermining the amount of antenna energy utilized by the amplifier. The slide contact 20 can be adjusted also so that the lamp 20 is not brought to glow until a certain signal strength is reached.

The photo-electric cell 10 can be either of the selenium type, or of the alkaline metals type, or of any other type whose internal resistance or actinic properties are sensitive to light.

The inclusion of a glow lamp in the volume control system in the manner shown has the further advantage of permitting the operator to determine at what point the automatic or the manually adjusted volume control begins to function.

Referring to Fig. 2 I have here shown a possible combination of the photo-electric cell 10' and the glow lamp 15' where the latter is mounted within the photo-electric cell, both having a common mounting base 16 and four prongs, two of which 21 and 22 are associated with the electrodes of the photo-electric cell and the other two 23 and 24 with the terminals of the glow lamp 15'.

While I have shown certain specific circuit arrangements, it is obvious that changes and modifications may be made without departing from the spirit of my invention, therefore the invention should only be limited by the scope of the appended claims.

Having described my invention, what I claim as new and desire to secure by United States Letters Patent is:

1. A receiving system, an audion tube in said system, a biasing resistance for said tube, a photoelectric device, a cooperating light source controlled by the flow of current across said biasing resistance, said light source connected across said biasing resistance and to ground, said photoelectric device connected between the antenna circuit of said system and ground whereby said light source and said photoelectric device control the output volume of said receiving system.

2. A radio receiving system including an antenna circuit, a photoelectric cell connected between said antenna circuit and ground, an output circuit for said system, a cooperating light source connected to said output circuit and to ground whereby said device and said light source co-operate to regulate the amount of energy utilized by said receiving system.

3. An amplifier circuit, a supply circuit therefor, a biasing resistance therefor, a photoelectric cell and a cooperative light source connected to said biasing resistance, said photoelectric cell connected between said supply circuit and ground and in shunt with said amplifier circuit, said biasing resistance located in the output of said amplifier circuit whereby said cell and light source cooperate to control the output volume of said amplifier circuit.

4. An amplifier system, an input circuit for said amplifier system, a shunt circuit across said input circuit, a photoelectric device in said shunt circuit, a biasing resistance in the output circuit of said system, a light source connected across said biasing resistance in the output of said amplifier, said light source controlling said photoelectric device to regulate the amount of current shunted by said photoelectric device.

5. A receiving system, amplifiers therein, a photoelectric device in shunt with one amplifier, a biasing resistance for a second amplifier connected to ground, a light source connected to said biasing resistance and to ground whereby said light source is energized by a variable current flowing in said biasing resistance, said light source located in proximity to said photoelectric device and affecting the resistance of said photoelectric device to regulate the amount of energy utilized by said amplifier.

6. A receiving system, a detector circuit and an amplifier circuit therefor, a photoelectric cell connected between the antenna of said system and ground and in shunt with said amplifier circuit, a biasing resistance in said detector circuit connected to ground, a light source connected to said biasing resistance and to ground and having its light intensity controlled through said connections by the energy flowing in said biasing resistance, said photoelectric cell located within the field of said light source and having its electrical resistance regulated by the intensity of said light source to control the amount of energy shunted by said photoelectric cell.

7. A receiving system, a light source, a photoelectric device connected to the antenna of said receiving system and in shunt with the first transformer of said system and reacted upon by said light source a biasing resistance in the output circuit of said system having one end connected to ground, a source of current, circuit connections connecting said source of current to said biasing resistance, means for varying the current in said resistance, an electrical conductor extending from said resistance to said light source, a second conductor extending from said light source to ground whereby the intensity of said light source is controlled by the variable current flowing in the output of said receiving system, said light source controlling the amount of incoming energy shunted through said photoelectric device to regulate the volume output of said receiving system.

8. A receiving system, a photoelectric device, a cooperating light source, manual control means for said light source, a supply circuit and an output circuit for said receiving system, a biasing resistance in said output circuit, a source of current, circuit connections connecting said source of current to said biasing resistance, electrical conductors bridging said photoelectric device across said supply circuit, circuit arrangements for said light source, said resistance and said photoelectric device whereby said light source and said photoelectric device control the output volume of said receiving system, the photoelectric cell and a glow lamp as the light source combined into a single mounting unit, the glow lamp being installed within the photoelectric cell upon a common base having four contact prongs.

9. The combination of an input and an output circuit, a biasing resistance for said output circuit, a source of current, circuit connections between said source of current and said resistance, means for varying the current in said resistance, a device controlled by the flow of current in said resistance and adapted to control a photoelectric device, and a photoelectric cell in shunt with said input circuit controlled by said device for regulating the input circuit.

10. The combination of a supply circuit and an output circuit, a biasing resistance in said output circuit, a device responsive to current changes in said biasing resistance and adapted to control a photoelectric device, and a photoelectric device in shunt with said supply circuit controlled by said first device for regulating the current input in the supply circuit.

11. The combination of a supply circuit and an output circuit, a biasing resistance for said output circuit, a device responsive to current changes in said resistance and adapted to control a photoelectric device, and a photoelectric device in shunt with said supply circuit controlled by said first device for regulating the current input in the supply circuit to maintain a substantially constant current in the output circuit, and a manual control means for said first device.

12. In a receiving system including an antenna circuit, a photoelectric cell connected between said antenna and ground, an output circuit for said system, a resistance in said output circuit, a cooperating light source connected to said resistance in said output circuit and to ground whereby said device and said light source cooperate to regulate the amount of energy utilized by said receiving system, said photoelectric cell and a glow lamp as the light source combined into a single unit, the glow lamp being installed within the photoelectric cell upon a common base.

13. The combination of an input and an output circuit, a resistance for said output circuit, a source of current, circuit connections between said source of current and said resistance, means for varying the current in said resistance, a lamp controlled by the current in said resistance, a photoelectric cell in shunt with said input circuit, said lamp being installed within the photoelectric cell as a single mounting unit.

14. The combination of an input and an output circuit, a source of current connected to said circuits, means for varying the flow of said current in a portion of said output circuit, a photoelectric cell in shunt with said input circuit and a lamp connected to said certain portion of said output circuit and controlled by the flow of said current therein, said lamp controlling the said cell and mounted within said cell upon a common base.

HERBERT M. ARMSTRONG.